(12) United States Patent
Athenstaedt et al.

(10) Patent No.: US 6,714,335 B2
(45) Date of Patent: Mar. 30, 2004

(54) ELECTROCHROMIC DIMMER SYSTEM

(75) Inventors: Wolfgang Athenstaedt, Graz (AT); Johann Stark, Graz (AT)

(73) Assignee: Magna Reflex Holding GmbH, Assamstadt (DE)

( * ) Notice: Subject to any disclaimer, the term of this patent is extended or adjusted under 35 U.S.C. 154(b) by 0 days.

(21) Appl. No.: 10/203,546

(22) PCT Filed: Feb. 7, 2001

(86) PCT No.: PCT/EP01/01312

§ 371 (c)(1), (2), (4) Date: Oct. 30, 2002

(87) PCT Pub. No.: WO01/57589

PCT Pub. Date: Aug. 9, 2001

(65) Prior Publication Data

US 2003/0137714 A1 Jul. 24, 2003

(30) Foreign Application Priority Data

Feb. 7, 2000 (DE) .......................... 100 05 678

(51) Int. Cl.$^7$ .............................................. G02F 1/155
(52) U.S. Cl. ........................ 359/267; 359/265; 359/271
(58) Field of Search ................. 359/267, 265, 359/268, 269, 271, 273, 275

(56) References Cited

U.S. PATENT DOCUMENTS

| | | |
|---|---|---|
| 3,844,636 A | 10/1974 | Maricle et al. |
| 4,787,716 A | 11/1988 | Kato et al. |
| 5,015,824 A | 5/1991 | Monter et al. |
| 5,223,976 A | 6/1993 | Fujie et al. |
| 6,208,075 B1 * | 3/2001 | Hung et al. .................. 313/504 |

FOREIGN PATENT DOCUMENTS

| | | |
|---|---|---|
| DE | 32 35 089 A | 3/1984 |
| DE | 196 01 539 A1 | 7/1996 |
| DE | 197 37 978 A | 3/1999 |
| EP | 0 851 271 A2 | 7/1998 |
| JP | 61277928 | 12/1986 |
| WO | WO 98/44385 | 10/1998 |

* cited by examiner

Primary Examiner—Scott J. Sugarman
Assistant Examiner—Richard Hanig
(74) Attorney, Agent, or Firm—McGarry Bair PC

(57) ABSTRACT

An electrochromic dimming system is proposed having two flat electrodes disposed on respectively a first and a second carrier, and an electrochromic layer arrangement, of which at least one element is arranged between the electrodes. The electrodes are provided with contact elements via which the electrodes can be connected to a voltage/current source. In the region of the peripheral edge of the electrode of the first carrier is arranged an annular conductive element which, possibly with the interposition of a conductive layer, is pressed onto the region of the peripheral edge of the second carrier receiving the other electrode. In the region of the peripheral edge of the second carrier is provided at least one feedthrough for connecting the one electrode to the current/voltage source.

14 Claims, 4 Drawing Sheets

ELECTROCHROMIC DIMMER SYSTEM

BACKGROUND OF THE INVENTION

Field of the Invention

The invention relates to an electrochromic dimming system in accordance with the preamble of the main claim.

Electrochromic dimming systems, e.g. dimming mirrors for motor vehicles are generally known in prior art. An essential element of these electrochromic mirrors is an electrochromic layer arrangement formed from an electrochromic material which, when an electrical field is applied to it, changes its optical constants and thus its visual properties. Typical examples of such electrochromic materials are $WO_3$ and $MoO_3$, which are applied in thin layers to a carrier and are practically colourless. An electrochromic layer can alter its visual properties by oxidation or reduction processes. If protons migrate in such a layer, in the case of tungsten oxide there is a reduction to blue tungsten bronze. The intensity of the colouring is determined by the amount of charge displaced in the layers.

Electrochemical liquids and gels and the like can also be used as the electrochromic material.

To contact the electrodes of such electrochromic systems, which may also serve as display or the like, the carriers bearing the electrodes and consisting of glass for example, are glued slightly offset to one another so that a projecting length remains. By this means, the flat electrodes directed inwards can be provided with contacting. Since the surface resistance of the electrode material is partially very high, the coupling of the electrical current must take place over as large a surface as possible via a good electrical conductor. This is realised with metal clips which are pushed over the projecting edges.

In the described contacting according to prior art, through the offset of the two pieces of glass to one another and the gluing, a broad edge is produced which cannot be darkened or dimmed. In addition, through the coupling of the voltage at the edges via the clips, there exists the problem that leads are supplied at the edge which have to be additionally protected, and this makes greater constructional outlay necessary. As a result of the voltage drop at the electrode which increases with increasing distance from the metal clip, the EC system is darkened non-homogeneously.

SUMMARY OF THE INVENTION

The purpose underlying the invention, therefore, is to create an electrochromic dimming system, in which contacting of the electrodes over a large surface is possible whilst minimising the edge necessary as a result of the contacting the position of the electrical connections pins or terminals to the supply should be selectable in a variable way.

This object is achieved according to the invention by the characteristic features of the main claim in conjunction with the features of the preamble.

Because there is arranged on the region of the peripheral edge of a carrier provided with a flat electrode, an annular conductive element which, possibly with the interposition of a conductive layer, is pressed onto the region of the peripheral edge of the second carrier of electrically isolating material receiving the other flat electrode, and because, in the region of the peripheral edge of the second carrier, at least one feedthrough is provided to connect the one electrode with a current/voltage source, contacting of the one electrode of the EC system is possible over a large area. No loss areas arise through crimp contacts and the edge which is not to be darkened can be reduced in a defined manner. Furthermore, contacting which is laid around the edge is avoided. Altogether the structure of the contact arrangement is relatively simple, the connection points may be arranged at any positions or the backside of the second carrier.

Through the measures quoted in the subordinate claims, advantageous developments and improvements are possible.

Particularly advantageous in an application of the electrochromic dimming system for a motor vehicle mirror, [is] the use of a printed circuit board or card since conductor tracks or electronic circuits or electronic components can be attached to the rear side of the printed circuit board. The connection point of the rear electrode can be freely selected and a plurality of feedthroughs which are connected by conductor tracks can be provided. With a multilayer printed circuit board, for example, heating of the mirror can be integrated with corresponding control electronics. A compact unit can be manufactured which is produced from the EC system with control electronics, a mirror heating system and additional electrical elements, such as humidity sensor, display or connector plug. The contacting according to the invention is also suitable for spherical and aspherical mirrors.

DESCRIPTION OF THE DRAWINGS

Embodiments of the invention are represented in the drawing and are described in greater detail in the following description. The figures show.

DESCRIPTION OF THE PREFERRED EMBODIMENT(S)

Figure 1:
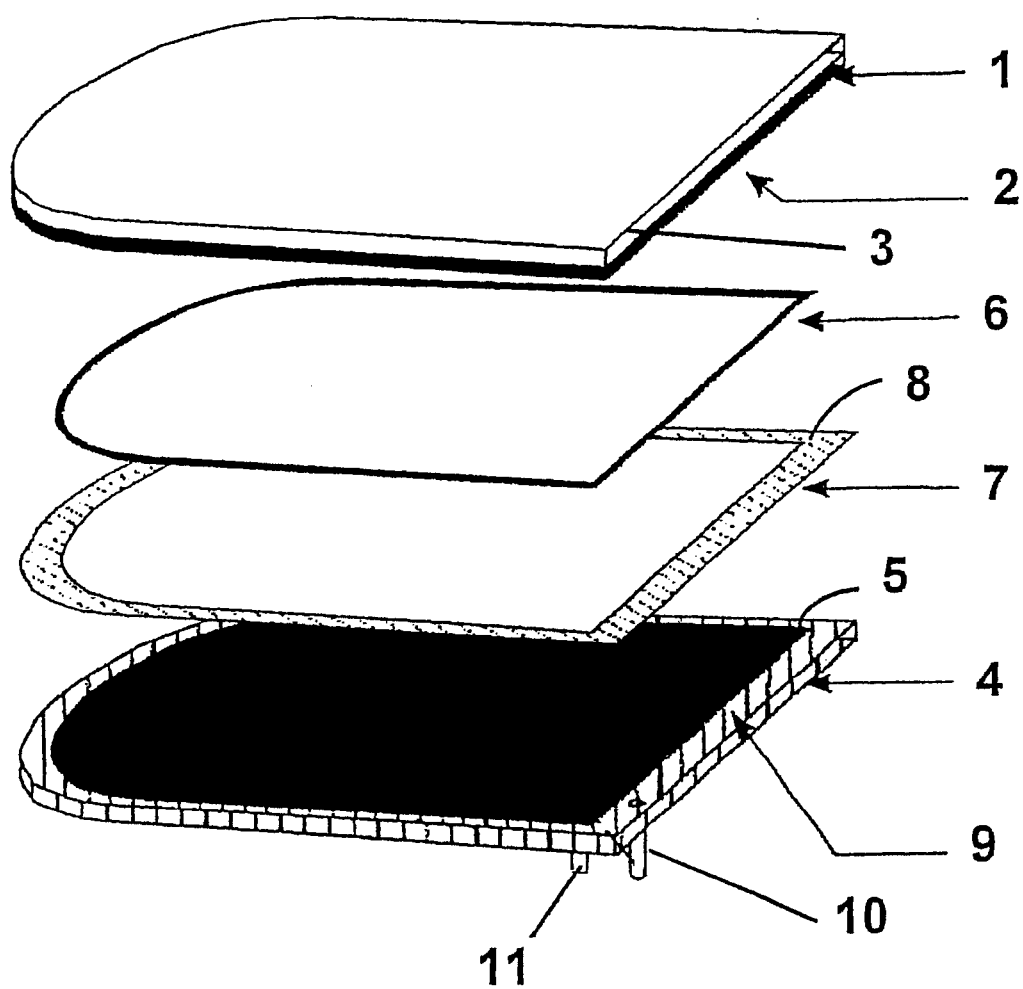
FIG. 1 a structure of the electrochromic dimming system according to the invention, in a disassembled perspective view, for use in a motor vehicle mirror, FIGS. 2*a,b* different embodiments of the carrier with rear electrode, in a perspective view, FIG. 3 a section through the electrochromic dimming system according to the invention, according to a first embodiment, FIG. 4 a section through the electrochromic dimming system according to the invention, according to a second embodiment and FIG. 5 a section through the electrochromic dimming system according to a third embodiment.

The electrochromic dimming system according to FIG. 1 is used on a motor vehicle mirror and has, viewed from the front side, a glass carrier 1 which is provided with an electrochromic layer 2, formed for example from tungsten oxide, to which an electrode 3 is attached. This electrode can consist of palladium for example, and it can simultaneously serve as a mirror layer. In case also a transparent electrode may be chosen.

On the opposite side of the electrochromic dimming system to the glass carrier 1, is arranged a further carrier 4 which is likewise coated with a flat electrode 5. Between the electrodes 3 and 5 lies an electrolyte 6, which is formed for example from a polymer membrane to form a proton-conducting and proton-storing layer. It should be noted that any gaseous, liquid or solid medium which can conduct protons is suitable as the intermediate layer.

To contact the front electrode 3, there is provided, corresponding to the peripheral edge of the glass carrier provided with electrode 3, an annular ring 7 which abuts peripherally against the electrode 3 and is pressed in its assembled state onto the carrier 4. Preferably, there is applied between electrode 3 and conductive ring 7 an adhesive glue, also in a ring shape, which supplies the mechanical stability. So that no short circuit occurs between the front electrode 3 and the rear electrode 5 via the electrically conductive ring 7, a separating trench 9, preferably an etch trench is incorporated peripherally at a spacing from the edge of the carrier or the rear electrode 5, which trench separates the rear electrode 5 from the annular electrode which is formed from the electrically conductive ring 7 and the glue 8. In case the back electrode is coated having a ring shaped distance to the edge of the carrier the additional separating trench is not necessary since then the annular electrode rests on the electrically non-conductive carrier.

The carrier 4 is provided in the region of the rear electrode 5 and in the region of the annular electrode 7, 8 with respectively at least one feedthrough, preferably a plurality of feedthroughs, which are respectively directly or via a conductor track connected to a connection contact 10, 11 for connecting to a power supply.

Figure 3:
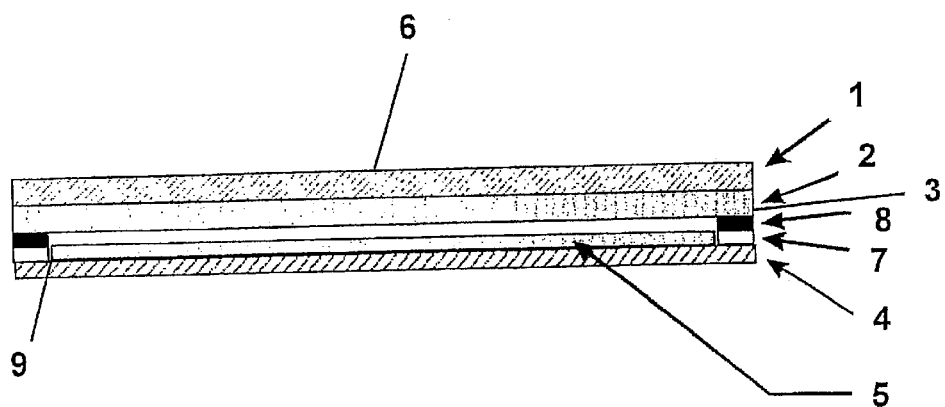

In FIG. 3 is represented a section of the electrochromic dimming system, the electrolyte 6 being located inside the annular electrode 7, 8. The conductive gluing 8 preferably has a sealing function and connects the whole system in a mechanically stable manner. Through the annular contacting via the annular electrode 7, 8, contacting over a large area is achieved, and simultaneously the non-active edge of the electrochemical element can be designed narrow.

Carrier 4 is preferably designed as a printed circuit board or foil for example of polymide, copper-clad on one or both sides, the side facing the electrolyte 6 representing the flat rear electrode 5, and the rear board side serving through formation of conductor tracks to connect the electrodes 3, 5 with the connection contacts 10, 11, and can moreover receive additional electrical elements, such as the control electronics for the electrochromic layer arrangement.

If a copper-clad conductive printed circuit board or foil is used, preferably a corrosion prevention layer is applied over the copper so that no signs of disintegration appear in the EC layer structure. The corrosion prevent layer can consist of gold, platine or the like. Over this layer is applied a proton-storing layer, e.g. formed from tungsten oxide. The conductive printed circuit board or foil preferably consists of a material, which serves as diffusion stop to prevent penetration of water.

Figure 2A:
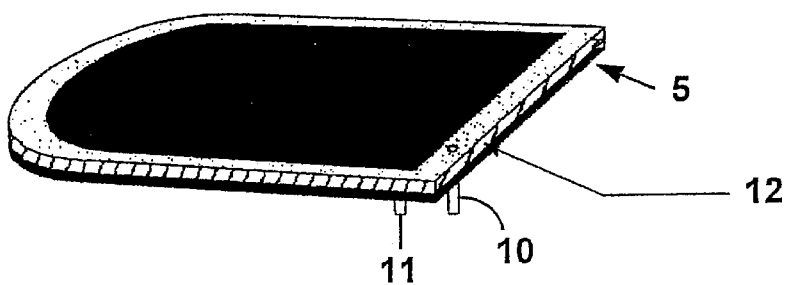
Figure 2B:
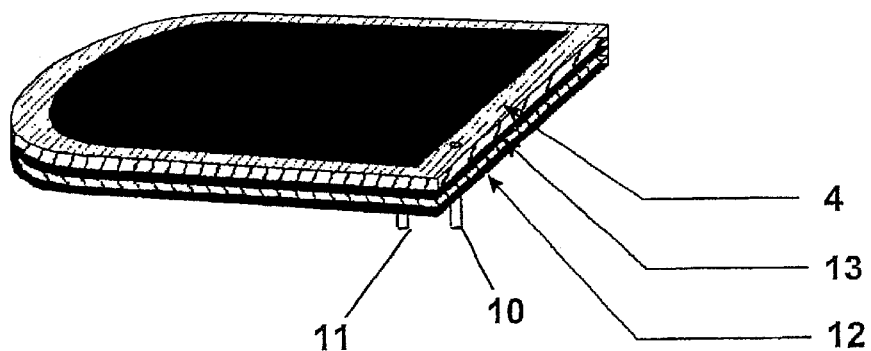

A carrier 5, copper-clad on both sides, is represented in FIG. 2a. On the rear side of carrier 4 the edge serving as conductor track 12 can be kept broader than the annular electrode, and one or several conductor tracks can also be drawn towards the centre, which makes contacting the contacts simpler, since the connection contacts 10, 11 do not have to lie in the edge zone, as represented in the figures. In FIG. 2b, the carrier 4 is configured as a multilayer printed circuit board, by which means it is possible to integrate an additional mirror heating layer into one of the layers. Furthermore, the electronics for a humidity sensor which controls the mirror heating can be integrated on the printed circuit board material. In the same way, through this heating the system can be raised to a certain temperature level so that the reaction speed of the system is accelerated when there is a very low ambient temperature.

Figure 4:
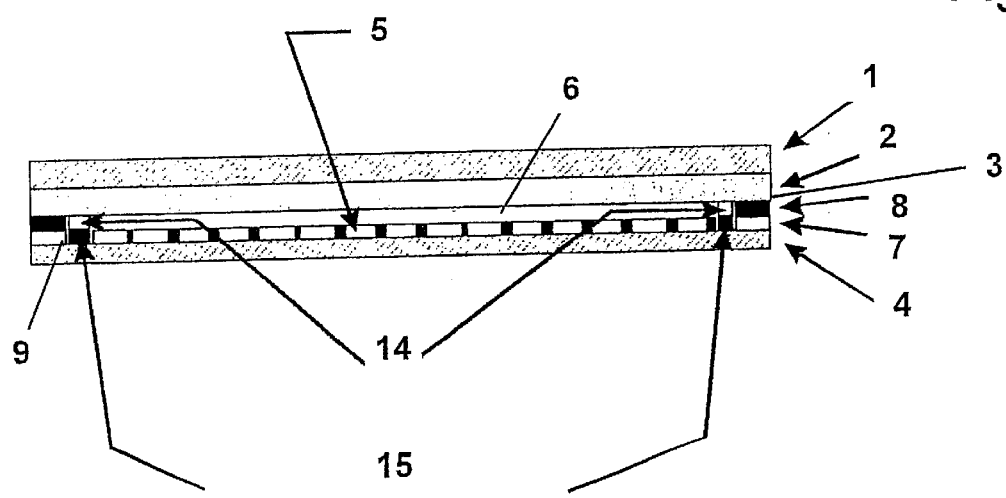

In FIG. 4 is represented a further embodiment of the electrochromic dimming system, in which a peripheral seal 14 is inserted which is formed by a line of adhesive or also as sealing material, and which serves as an additional diffusion barrier. When a sealing material is used, it has proved to be advantageous to etch a structure into the surface of the conductor material, so that a cutting edge 15 is produced which presses into the sealing material 14. An additional improvement of the system can be achieved if additional etch trenches are provided on the printed circuit board. By this means the course of the conductive adhesive 8 can be deliberately controlled.

Figure 5:
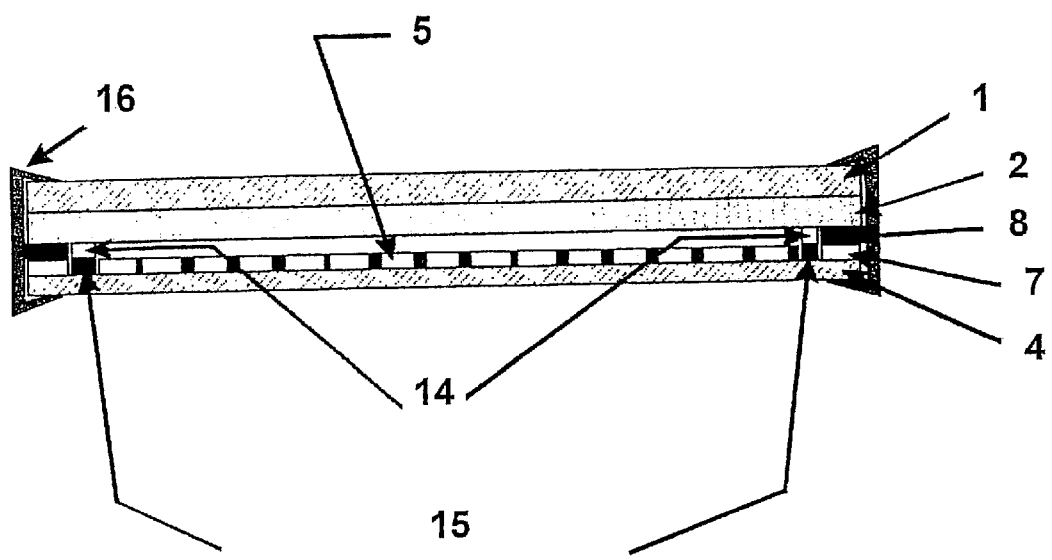

In FIG. 5, a third embodiment of the invention is represented in which a peripheral frame or a peripheral clamp 16 grips round the edges of the carriers 1 and 4 and presses the whole arrangement together.

The above described contacting may be applied to different EC systems. Depending on the EC system and its structure, one or both electrodes can be transparent. If the front electrode is transparent, for use as a mirror, the mirror can be applied directly to the rear carrier or, if this is also transparent, to the rear side of same. A further layer structure is: glass, transparent electrode, EC layer, mirror layer, electrolyte or membrane as proton-conducting layer, proton store, electrode.

All types of electrochromic systems can be used for the contacting proposed, for example electrochromic liquids can be used.

The above-described contacting is also suitable for spherical and aspherical mirrors, wherein preferably also the carriers, e.g. the printed circuit board, are curved.

What is claimed is:

1. Electrochromic dimming system having two flat electrodes disposed on respectively a first and a second carrier, and an electrochromic layer arrangement, of which at least one element is disposed between the electrodes, the electrodes being provided with contact elements via which the electrodes can be connected to a voltage/current source, characterised in that there is disposed on the region of the peripheral edge of the electrode (3) of the first carrier (1), an annular conductive element (7, 8) which, is pressed onto the region of the peripheral edge of the second carrier (4) receiving the other electrode (5), and in that at least one feedthrough is provided in the region of the peripheral edge of the second carrier (4) for a connection of the one electrode to the current/voltage source.

2. Dimming system according to claim 1, characterised in that the annular conductive element is configured as a metal annular electrode (7) and/or electrically conductive adhesive (8) and/or electrically conductive sealing material.

3. Dimming system according to claim 1 or claim 2, characterised in that the carriers (1, 4) are coated substantially over their entire surface with electrically conductive material to form the electrodes (3, 5), the coating of the second carrier (4) being interrupted at a spacing from the edge over the entire perimeter by a trench (9), in such a way that there is an electrical separation.

4. Dimming system according to claim 1, characterised in that the conductive adhesive (8) glues the carriers (1, 4) to one another to form a seal in their edge region, and connects them to one another to be mechanically stable.

5. Dimming system according to claim 1, characterised in that the electrochromic layer arrangement has an electrochromic layer (2) and an electrolyte (6), the latter being limited on both sides by the electrodes (3, 5).

6. Dimming system according to claim 1, characterised in that the second carrier (4) has at least one feedthrough in the region of the electrode (5) disposed upon it.

7. Dimming system according to claim 1, characterised in that a seal (14), running around the at least one element (6)

of the electrochromic layer arrangement between the electrodes (3, 5) in the edge region, is provided as a diffusion barrier.

8. Dimming system according to claim 1, characterised in that the second carrier (4) is provided in the edge region with at least one peripheral depression (15), lying inwardly of the annular conductive element, to receive adhesive, sealing material or seal and/or to form at least one cutting edge to press into the sealing material.

9. Dimming system according to claim 1 to be used as a spherical or aspherical motor vehicle mirror, characterised in that the second carrier (4) is a printed circuit board and the first carrier a glass plate and in that one of the electrodes (3) is designed as reflective mirror layer.

10. Dimming system according to claim 9, characterised in that the printed circuit board is provided, on at least one of the surfaces remote from the electrode surface, with conductor tracks for the feedthroughs and/or electrical and/or electronic components to control the electrochromic layer arrangement.

11. Dimming system according to claim 9 or claim 10, characterised in that the printed circuit board is provided as a multilayer printed circuit board to receive and configure additional electrical elements and circuits.

12. Dimming system according to claim 9, characterised in that an additional heating layer (13) is provided on the second carrier (4) to heat the mirror.

13. Dimming system according to claim 11, characterised in that a corrosion prevention layer is applied to at least one electrode.

14. Dimming system according claim 1, characterised in that a conductive layer is interposed with the annular conductive element (7, 8).

* * * * *